United States Patent [19]

Miura et al.

[11] 4,278,261
[45] Jul. 14, 1981

[54] SEALING DEVICE

[75] Inventors: Takeshi Miura; Yasuo Yamamoto, both of Fukushima, Japan

[73] Assignee: Nippon Oil Seal Industry Co., Ltd., Tokyo, Japan

[21] Appl. No.: 50,526

[22] Filed: Jun. 21, 1979

[30] Foreign Application Priority Data

Aug. 23, 1978 [JP] Japan .......................... 53-115309[U]

[51] Int. Cl.³ ............................................. F16J 15/32
[52] U.S. Cl. .................................................. 277/153
[58] Field of Search ........ 277/152, 153, 189, 181–186, 277/211

[56] References Cited

U.S. PATENT DOCUMENTS

| 2,959,431 | 11/1960 | Foss | 277/211 |
| 3,170,701 | 2/1965 | Hoover | 277/211 |
| 3,215,442 | 11/1965 | Papenguth | 277/211 |
| 3,572,732 | 3/1971 | Sekulich | 277/153 |
| 3,612,547 | 10/1971 | Kan | 277/153 |

Primary Examiner—Robert I. Smith
Attorney, Agent, or Firm—Holman & Stern

[57] ABSTRACT

The present invention relates to a sealing device comprising a sealing member and a cap, said sealing member consisting of a reinforcement ring with an axial portion and radial portion, a rubber lip portion secured to the end of the radial portion, and a lip-like annular sealing piece secured to the side of the radial portion, said cap consisting of a cylinder portion and a flange portion extending inwardly in the radial direction from the cylinder portion, whereby the axial portion of said reinforcement ring engages with the inside of the cylinder portion of the cap and the annular sealing piece bears tightly against the inner surface of the flange of the cap.

1 Claim, 4 Drawing Figures

SEALING DEVICE

BRIEF SUMMARY OF THE INVENTION

This invention relates to a sealing device which provides good sealing against the oil leakage from the engaging portion between the cap and the ring.

DESCRIPTION OF THE PRIOR ART

In the conventional sealing device which uses metallic material in the contacting portions, sufficiently tight sealing between the cap and the ring cannot be obtained. FIG. 1 shows one example of the conventional sealing apparatus. In this drawing, the sealing member 1 comprises a reinforcement ring 2 consisting of an axial portion 3 and a radial portion 4 extending inwardly in the radial direction from the axial portion 3, and a lip portion 5 made of rubber and secured to the end of the radial portion 4. The cap 6 is comprised of a cylinder portion 7 extending axially and a flange 8 extending inwardly in the radial direction from the cylinder portion 7. The axial portion 3 of the reinforcement ring 2 is brought into contact with the inside of the cylinder portion 7 of the cap 6.

In this kind of sealing device the sealing between the cap 6 and the reinforcement ring 2 is not sufficient. In order to overcome this disadvantage it has been a common practice, as shown in this drawing, to fit the rubber 9 to the end of the axial portion 3 of the reinforcement ring 2 and bring it into pressurized engagement with the inner surface of the cap 6 so as to close the gap between the cylinder portion 7 and the reinforcement ring 2.

In this construction, however, it is necessary to finish to high degree of accuracy the contacting surfaces, i.e., the outer surface of the axial portion 3 and the inner surface of the cylinder portion 7. In addition, this construction has such disadvantages that the rubber 9 is torn when fitting the sealing member 1 to the cap 6 or the inner surface of the cap 6 is rubbed off, deteriorating the sealing between the ring 2 and the cap 6.

In FIG. 2, the radial portion 4 of the reinforcement ring 2 is provided on its side with the circular, wide rubber band 9 which bears tightly against the side of the flange 8 of the cap 6. This construction also has drawbacks. That is, since the contacting area of the rubber band 9 with the sides of the cap 6 is large, the pressure per unit area is small so that when the gap between the ring 2 and the cap 6 is widened in the axial direction the rubber cannot compensate for the displacement of the flange 8 and therefore the tight sealing cannot be maintained.

An object of this invention is to provide a sealing device which provides a sufficient sealing against the oil leakage from the contacting portion between the ring and the cap.

Another object of this invention is to provide a sealing device which has a rubber lip portion for preventing the oil leakage from the contacting portion between the ring and the cap.

DETAILED DESCRIPTION

This invention has been accomplished to overcome the aforementioned drawbacks of the conventional sealing device. In the sealing device according to this invention, a lip-shaped annular sealing piece projecting in the axial direction and secured to the side of the radial portion of the reinforcement ring is pressed against the inner surface of the flange of the cap to prevent the oil leakage from between the reinforcement ring and the cap. The annular sealing piece may take other forms such as cylinder or trunkated cone, and its end may be pointed or rounded.

One embodiment of the present invention will be described with reference to the accompanying drawings.

Figure 1:
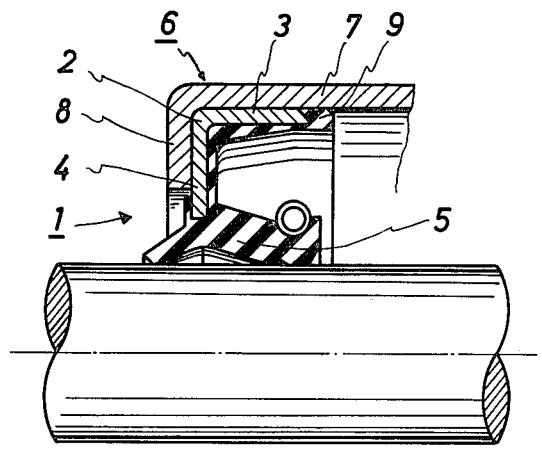
FIG. 1 is a cross-sectional view of the conventional sealing device.
Figure 2:
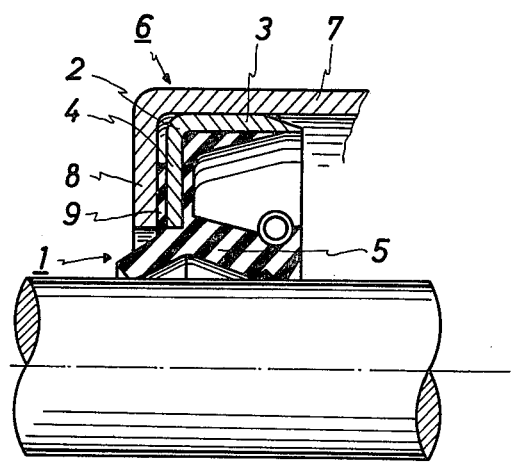
FIG. 2 is a cross-sectional view of the partially improved conventional sealing device.
Figure 3:
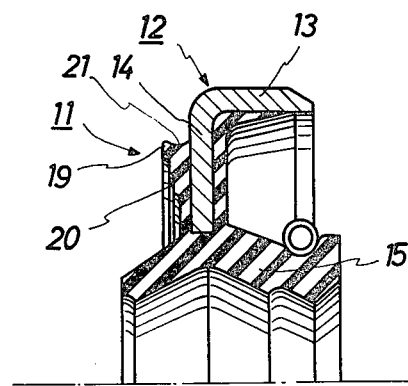
FIG. 3 is a cross-sectional view of the sealing member, before being fitted to a shaft, for use in the sealing device of this invention.
Figure 4:
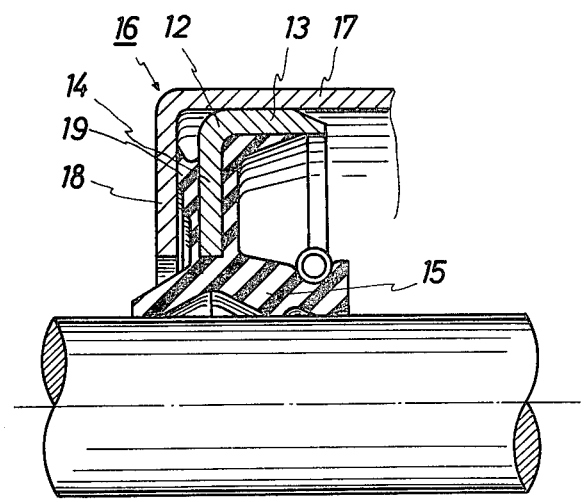
FIG. 4 is a cross-sectional view of the sealing device of this invention using the sealing member in FIG. 3.

Referring to FIGS. 3 and 4, the sealing member 11 comprises a lip portion 15 and a lip-like annular sealing piece 19, both of them being made of rubber and constructed integral with each other. The lip portion 15 is fitted to the end of the radial portion 14 of the reinforcement ring 12 and extends axially. The lip-like sealing piece 19 is formed to project axially from the intermediate portion of the radial portion 14 of the ring 12 and is connected to the lip portion through a step portion 20, and an annular groove 21 is formed at the outer surface of the lip-like annular sealing piece 19. When the sealing member 11 assembles with the cap 16, the lip-like sealing piece 19 is pressed between the radial portion 14 of the ring 12 and the flange 18 of the cap 16.

With this construction the sealing device of this invention is expected to bring about ther following effects. That is, when the reinforcement ring 12 and the cap 16 are clamped together, the lip-like annular sealing piece 19 made of rubber which is fitted to the side of the radial portion 14 and projects in the axial direction is pressed against the flange 18 of the cap 16, so that the oil leakage from between the ring 12 and the cap 16 can be prevented. The tight sealing can be obtained regardless of the degree of the surface finish of the engaging portions between the ring 12 and the cap 16. By forming the annular sealing piece 19 in a desired configulation and dimension, the tight sealing can also be maintained irrespective of the axial relative position of the ring 12 and the cap 16. Although in the preferred embodiment the annular sealing piece 19 and the lip portion 15 are shown integral with each other, they may be formed as separate members and secured to the ring 2.

Further, the step portion 20 is provided between the annular sealing piece 19 and the lip portion 15 so as to ensure smooth positioning of the sealing member 11 on the cap 16 and effectively protect the annular sealing piece 19 from excessive pressure.

Furthermore, the deformation of the lip-like annular sealing piece 19 in the radial direction can be obtained easily and certainly by the presence of the annular groove 20. Therefore, the annular groove can also protect the annular sealing piece 19 from excessive pressure.

What is claimed is:

1. In a sealing device for a rotating shaft having a reinforcement ring with an axial portion and a radial portion, an annular lip element made of rubber secured to the inner end of said radial portion and adapted for sealing engagement on its inner surface with the shaft, a cap having a cylindrical portion and a radial flange being positioned in use so that the inner surface of said cylindrical portion engages the outer surface of said axial portion of said ring and an annular space is provided between said flange and said radial portion of said reinforcement ring, and a lip-like annular rubber seal extending radially from said lip element in said annular space, the improvement comprising an annular groove in the radially outermost surface of said lip-like annular seal and a stepped portion in the surface of said lip-like annular seal adjacent the inner surface of said flange forming a reduced thickness toward the radially inner portion of said seal, said radially outer portion of said seal being tightly compressed between said radial flange of said cap and said radial portion of said reinforcement ring.

* * * * *